United States Patent
Shipp

(10) Patent No.: US 7,472,284 B2
(45) Date of Patent: Dec. 30, 2008

(54) METHOD OF, AND SYSTEM FOR DETECTING MASS MAILING VIRUSES

(75) Inventor: Alexander Shipp, Gloucester (GB)

(73) Assignee: Messagelabs Limited, Gloucester (GB)

( * ) Notice: Subject to any disclaimer, the term of this patent is extended or adjusted under 35 U.S.C. 154(b) by 602 days.

(21) Appl. No.: 10/500,960

(22) PCT Filed: Mar. 8, 2004

(86) PCT No.: PCT/GB2004/000990

§ 371 (c)(1),
(2), (4) Date: Sep. 3, 2004

(87) PCT Pub. No.: WO2004/098148

PCT Pub. Date: Nov. 11, 2004

(65) Prior Publication Data

US 2005/0091512 A1    Apr. 28, 2005

(30) Foreign Application Priority Data

Apr. 25, 2003  (GB) ................................. 0309465.3

(51) Int. Cl.
*G08B 23/00* (2006.01)
(52) U.S. Cl. ........................................ 713/188; 726/24
(58) Field of Classification Search .................. 713/188; 726/24
See application file for complete search history.

(56) References Cited

U.S. PATENT DOCUMENTS

| 5,832,208 | A | 11/1998 | Chen et al. | |
|---|---|---|---|---|
| 2002/0199120 | A1 | 12/2002 | Schmidt | |
| 2003/0065926 | A1* | 4/2003 | Schultz et al. | 713/188 |
| 2003/0079142 | A1 | 4/2003 | Margalit et al. | |
| 2003/0167402 | A1* | 9/2003 | Stolfo et al. | 713/200 |

FOREIGN PATENT DOCUMENTS

| EP | 1 280 039 A2 | 1/2003 |
|---|---|---|
| GB | 2367714 A | 4/2002 |
| WO | WO 02/19069 A2 | 3/2002 |

OTHER PUBLICATIONS

"Postfix Configuration—UCE Controls", Internet Citation, 'Online! Apr. 13, 2003, pp. 1-12; XP002287121.

* cited by examiner

*Primary Examiner*—Andrew L Nalven
(74) *Attorney, Agent, or Firm*—Nixon & Vanderhye, PC

(57) ABSTRACT

A system for anti-virus processing an email having an executable attachment extracts structural elements of the email and examines the executable attachments for code, data or encoded data that could have created these elements. This is effective to detect at least some mass mailing viruses where the executable attachment creates later generations of the attachment and structural elements such as strings which appear in the later emails are present in the attachment.

14 Claims, 1 Drawing Sheet

METHOD OF, AND SYSTEM FOR DETECTING MASS MAILING VIRUSES

This application is the U.S. national phase of international application PCT/GB04/00990, filed 08 Mar. 2004, which designated the U.S. and claims priority to GB Application No. 0309465.3, filed 25 Apr. 2003. The entire contents of these applications are incorporated herein by reference.

BACKGROUND AND SUMMARY

The present invention relates to a method of, and system for, detecting mass mailing viruses.

The internet and local- and wide-area networks are susceptible to the exploits of mass mailing viruses. Typically, these viruses involve an email with an executable attachment which, when it executes, causes more virus-containing emails to be created and sent, flooding the network with traffic and its email users with unwanted emails.

These mass mailing viruses have become increasingly sophisticated: early forms of them chose the addressees from the name and address book associated with the recipient's email client, while more recent forms use a variety of techniques to gather addresses.

As the number of mass mailing viruses has grown, the authors of anti-virus scanning systems have had to enhance their systems to try and keep up with the threat. One tried and tested technique for detecting viruses is "signature scanning", where a file, an executable attachment in the case of email, is scanned for signatures, i.e. sequences, or patterns of sequences, of bytes which have been identified as characteristic of particular viruses. However, signature-based scanning is not particularly effective for dealing with mass mailing viruses, because the time taken for the virus to do its work and cause copies of itself to be sent is small compared with the time it takes for anti-virus software houses to disseminate updates to their system to deal with it when an outbreak of a new virus occurs. This is particularly a problem where the anti-virus service is being operated on behalf of a large number of users, as may be the case where an ISP (Internet Service Provider) carries out anti-virus scanning, of email and other files in transit, on behalf of customers as a value-added service.

The present invention is based upon an appreciation of the fact that concentrating on executable attachments overlooks a fertile source of viral-indicating information, namely the email itself and operates by carefully considering the whole email, rather than just the attachments.

According to the present invention, there is provided a method of anti-virus processing an email having one or more executable attachments comprising the steps, executed by a machine, of:

a) extracting structural elements from the email;

b) examining the executable attachments for code, data or encoded data that could have created the structural elements extracted earlier; and c) examining signalling that the attachment is possibly viral or not on the basis of the extent to which the examining step b) finds evidence that the structural elements have been created.

The invention also provides a system for anti-virus processing an email having an executable attachment comprising the following means, implemented by a machine:

a) means for extracting structural elements from the email;

b) means for examining the executable attachments for code, data or encoded data that could have created the structural elements extracted earlier; and c) means for signalling that the attachment is possibly viral or not on the basis of the extent to which the examining step b) finds evidence that the structural elements have been created by that attachment.

BRIEF DESCRIPTION OF THE DRAWING

The invention will be further described by way of non-limitative example with reference to the accompanying drawing in which.

DETAIL DESCRIPTION OF EXAMPLE EMBODIMENTS

Figure 1:
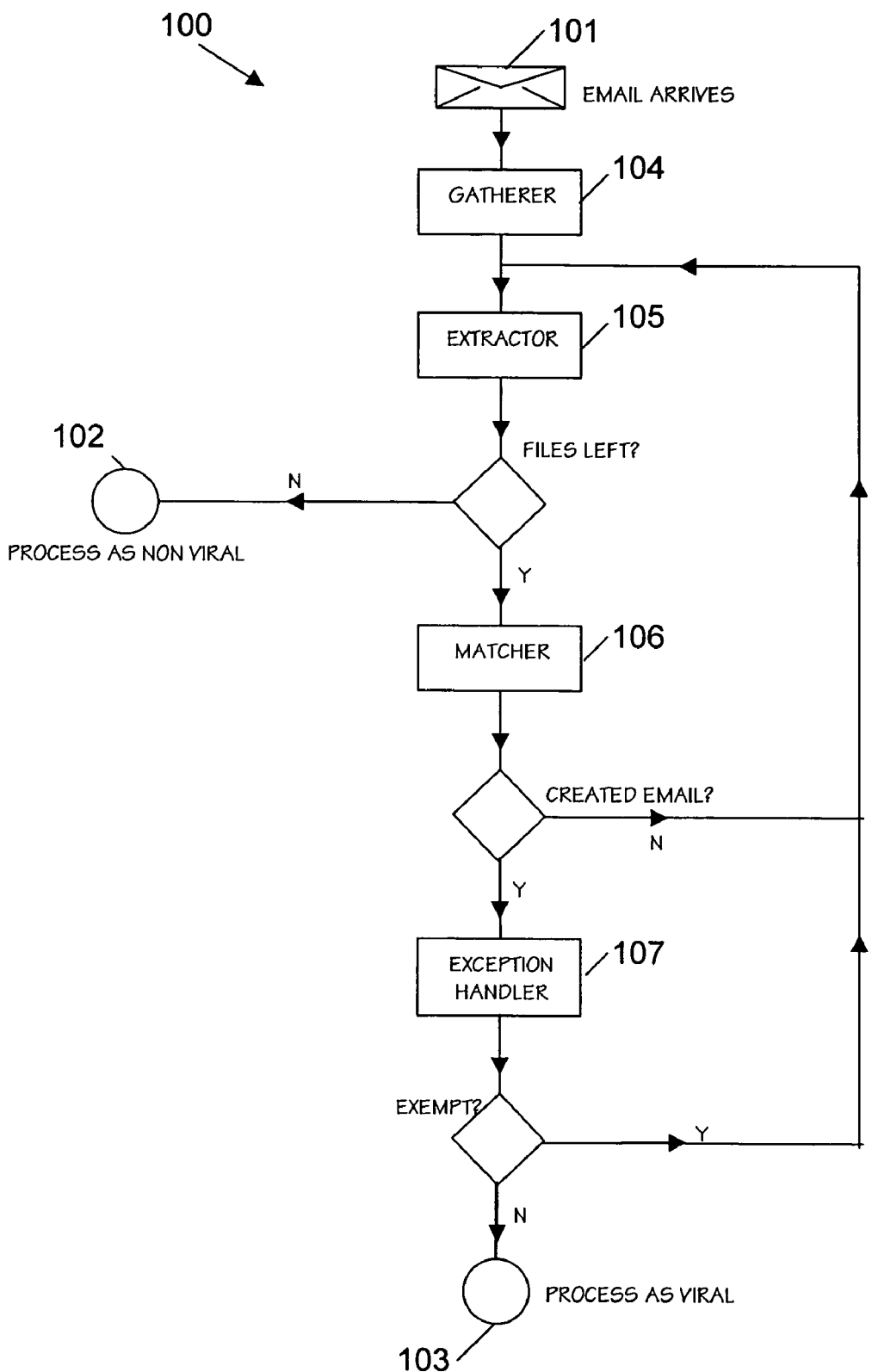
FIG. 1 illustrates one embodiment of system according to the present invention.

The system 100 operates on emails arriving at an input 101 and processes each one to signal either at an output 102 that the system regards that email as non-viral or at an output 103 that the system regards it as viral or possibly viral. The system may be operated as a stand-alone system, or as part of a larger anti virus system either as the module with responsibility for processing e-mails or in conjunction with additional sub-systems which apply additional virus-detection heuristics to emails which it has signalled as possibly viral.

Most prior virus scanners scan email by taking the email, extracting the attachments, and then scanning them for malware. The system 100, on the other hand, operates on the basis that by carefully considering the email as a whole, rather than just the attachments, it is possible to greatly increase the chances of detecting mass mailing viruses.

Each email client creates emails in its own unique way, producing what one might term an email 'fingerprint' which is discernible in emails created by it. By examining the structure of emails it is possible with some certainty to say, for instance, that a particular email was created by Microsoft Outlook, or Lotus Notes, or Eudora. Mass mailing viruses are also one form of email client, since they generate emails, and they will create emails with a particular fingerprint. By carefully examining the executable attachment and comparing it with the fingerprint of the email it is contained in, it is possible to say with some certainty whether the attachment generated the actual email, and this is a very good sign that the attachment is a mass mailing virus.

The system 100 operates according to the following algorithm:

1) A 'gatherer' 104 takes the email from input 101, and creates fingerprint information about the email structure.

2) An 'extractor' 105 extracts the next attachment from the email. If there are no more attachments left; processing stops.

3) An 'analyser/matcher' 106 analyses the attachment to see if it is likely that the attachment created the email by comparing with the fingerprint information. If it is not likely that the attachment created the email, return to step 2.

4) An 'exception checker' 107 checks for known exceptions. If an exception list match is found, return to step 2.

5) The email is flagged at output 103 as possibly containing a mass mailing virus.

The gatherer 104 parses the email, searching for structural information. For example, this could include (but is not limited to) the following:

Standard Mime headers created

Unusual Mime headers created

Deviations from RFC standards (for example, missing out the final MIME boundary)

Unusual construct which are legal according to the RFC standards, but which are not generally used by mainstream email clients—eg unusual capitalisation of MIME headers; comment fields used in certain MIME headers where they are not normally used; nested comment fields Number of attachments Type of attachments Encoding method used for attachments Text content of the email HTML/XHTML content of the email A simple implementation of the extractor 105 parses the email, presenting attachments in turn to the analyser/matcher 106. This can be improved by recursively analysing compound attachments. For instance, if the attachment is an archive such as a ZIP file, it will extract each file, presenting these in turn to the analyser/matcher 106. If these files are also archives, these will also be extracted in turn and so on until no more extraction can be done. Files packed using packers such as UPX or ASPack can be unpacked. Self-extracting executables can have the files they contain extracted.

The extractor 105 can also have extra logic to detect situations where a malicious attacker tries to attack the system by sending files that extract to extremely large sizes, or that take a very long time to extract.

The analyser/matcher 106 analyses the file to try and determine whether it contains code that creates emails matching the fingerprint created by the gatherer. Each match-type is assigned a certain score. For instance, a match of a particular deviation from an RFC standard may score X, and a match of the text content of the email may score Y.

Scores are added together and if they pass a set value, this is deemed a match.

The analyser/matcher 106 can be incredibly simple. For instance, an analyser that merely extracts strings from a file using the standard linux 'strings' command (which returns the strings of printable characters in a file), and matches these against the text content of the email, is sufficient to detect most mass mailing viruses currently in existence.

Of course, the more complex the analyser/matcher 106 is, the better the detection rate will be. For instance, cryptographic routines can be added to detect encoded email text, as used by the W32/Klez.H virus. Code analysing routines can be added to search for email specific routines, and work out how any email is created, and so on.

The exception checker 107 contains rules to filter out false positives that have occurred in the past. For instance, if someone uses the Eudora email client to mail a copy of Eudora to a friend, the fingerprints will match the attachment causing the email to be treated as viral. This can be overcome by for instance, creating an MD5 checksum of the attachment, and comparing to a list of known MD5 checksums for standard mail clients; the exception checker can then recognise these known email clients and ignore them. MD5 is an example of a checksum or hashing method sensitive enough to detect whether even a single bit in the data from which the checksum is derived has been changed.

As noted above, the system 100 can be used as a stand-alone virus detection algorithm, or combined with others implementing other virus-detection techniques as part of a larger system. For instance, files flagged as mass mailing viruses by this method may be allocated a certain score, or variety of scores depending which tests pass and fail. File which score some matches, but not enough for the matcher to flag as a mass mailing virus may be assigned a lower score.

These are then combined with scores from other heuristic techniques, and only if the total score passes some limit is the file flagged as viral.

Code analysis can also be used by the analyser/matcher 106. For instance, the MIME headers in a mail will be present in a certain order, and if it can be ascertained by code analysis that the attachment creates emails with the MIME headers in that exact order, then this is a very good sign that the attachment created the email. A simple implementation can be achieved by finding references in the code to the data areas used to construct the email, and then noting the order in which these references occur.

Virus writers often encode parts of the data area of their programs in order to try and hide what they are doing. Attempts can be made in various ways to match parts of the email to data which is encrypted in the attachment. For instance, if the email contains the text:

we seem to sew this might be encoded as er drrz yp dre

First we number the string

12345678901234 we seem to sew

Then we note that the letter 'w' in the original occurs in the 1st and 14th positions in the original. We also note the letter 'e' in the potential encoded string also occurs in the 1st and 14th positions, and in no other position.

Next we note that the letter 'e' in the original occurs in the 2nd, 5th, 6th and 13th position in the original. We also note the letter 'r' in the potential encoded string also occurs in the 2nd, 5th, 6th and 13th positions, and in no other position.

Thus, the potential encoded string so far seems to be the same as the original string, but with the letter 'e' replacing the letter 'w' and letter 'r' replacing the letter 'e'. If we can repeat this test successfully for each different character in the original string, then it is highly likely that the second string really is an encoded version of the original string.

The analyser/matcher 106 may be arranged to execute algorithms such as the one just described in order to find evidence that the attachment could have created structural elements of the email.

I claim:

1. A method of anti-virus processing an email having an executable attachment comprising the steps, executed by a machine, of:
   a) extracting structural elements from the email;
   b) examining the executable attachment and comparing the executable attachment with the extracted structural elements to determine whether the executable attachment contains code, data or encoded data that could have created the extracted structural elements; and
   c) signalling that the attachment is possibly viral or not on the basis of the extent to which the examining step b) finds evidence that the structural elements have been created by that attachment.

2. A method according to claim 1, wherein the structural elements are categorised and the step c) includes assigning a numeric score for each element which could have been created by that attachment, and signalling that the attachment is possibly viral or not on the basis of an overall score.

3. A method according to claim 2, wherein the scores are weighted according to category.

4. A method according to claim 1, wherein the signalling step c) takes account of factors including any or all of the following attributes of the email:
   standard MIME headers;
   unusual MIME headers;
   deviations from RFC standards;
   unusual constructs;

number of attachments;
type of attachments;
encoding method used for attachments;
text content of the email; and
HTML or XHTML content of the email.

5. A method according to claim 1, wherein the step a) includes extracting the structural elements as strings, the step b) includes examining the attachments for matches of those strings and the step c) signals the attachment as possibly viral or not on the basis of the extent to which the examining step b) finds occurrences of the strings in the attachment.

6. A system for anti-virus processing an email having an executable attachment comprising the following means, implemented by a machine:
   a) means for extracting structural elements from the email;
   b) means for examining the executable attachment and comparing the executable attachment with the extracted structural elements to determine whether the executable attachment contains code, data or encoded data that could have created the extracted structural elements; and
   c) means for signalling that the attachment is possibly viral or not on the basis of the extent to which the examining step b) finds evidence that the structural elements have been created by that attachment.

7. A system according to claim 6, wherein the structural elements are categorised and the means c) includes means for assigning a numeric score for each element which could have been created by that attachment, and signalling that the attachment is possibly viral or not on the basis of an overall score.

8. A system according to claim 7, wherein the scores are weighted according to category.

9. A system according to claim 6, wherein the means c) takes account of factors including any or all of the following attributes of the email:
   standard MIME headers;
   unusual MIME headers;
   deviations from RFC standards;
   unusual constructs;
   number of attachments;
   type of attachments;
   encoding method used for attachments;
   text content of the email; and
   HTML or XHTML content of the email.

10. A system according to claim 6, wherein the means a) extracts the structural elements as strings, the means b) examines the attachments for matches of those strings and the means c) signals the attachment as possibly viral or not on the basis of the extent to which the means b) finds occurrences of the strings in the attachment.

11. A method of anti-virus processing an email having an executable attachment comprising the steps, executed by a machine, of:
   a) extracting structural elements from the email;
   b) examining the executable attachment for code, data or encoded data that could have created the extracted structural elements; and
   c) signalling that the attachment is possibly viral or not on the basis of the extent to which the examining step b) finds evidence that the structural elements have been created by that attachment,
   wherein the step a) includes extracting the structural elements as strings, the step b) includes examining the attachment for matches of those strings and the step c) signals the attachment as possibly viral or not on the basis of the extent to which the step b) finds occurrences of the strings in the attachment.

12. A computer readable medium having stored thereon instructions for causing a computer to carry out a method of processing an email having an executable attachment, the method comprising:
   a) extracting structural elements from the email;
   b) examining the executable attachment and comparing the executable attachment with the extracted structural elements to determine whether the executable attachment contains code, data or encoded data that could have created the extracted structural elements; and
   c) signalling that the attachment is possibly viral or not on the basis of the extent to which the examining finds evidence that the structural elements have been created by that attachment.

13. A system comprising the computer-readable medium according to claim 12.

14. The computer readable medium according to claim 12, wherein the extracting extracts the structural elements as strings, the examining examines the attachment for matches of those strings and the signaling signals the attachment as possibly viral or not on the basis of the extent to which the examining finds occurrences of the strings in the attachment.

* * * * *